United States Patent
Adachi

(10) Patent No.: US 10,507,860 B2
(45) Date of Patent: Dec. 17, 2019

(54) STEERING WHEEL

(71) Applicant: TOYODA GOSEI CO., LTD., Kiyosu-shi, Aichi-ken (JP)

(72) Inventor: Motoki Adachi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/353,453

(22) Filed: Mar. 14, 2019

(65) Prior Publication Data
US 2019/0300039 A1  Oct. 3, 2019

(30) Foreign Application Priority Data
Mar. 28, 2018  (JP) .................. 2018-062488

(51) Int. Cl.
*B62D 1/04* (2006.01)
*B62D 15/02* (2006.01)

(52) U.S. Cl.
CPC ............ *B62D 1/04* (2013.01); *B62D 15/029* (2013.01)

(58) Field of Classification Search
CPC . B62D 1/046; B62D 1/06; B62D 1/08; B62D 15/029; B62D 1/04; B60Q 9/00
See application file for complete search history.

(56) References Cited

U.S. PATENT DOCUMENTS

| | | | | |
|---|---|---|---|---|
| 7,852,225 | B2 * | 12/2010 | Lemasson | B62D 1/046 340/407.1 |
| 9,136,075 | B2 * | 9/2015 | Chun | H01H 25/00 |
| 9,598,098 | B2 * | 3/2017 | Sakurai | B62D 1/04 |
| 9,738,302 | B2 * | 8/2017 | Sakurai | B62D 1/046 |
| 9,884,641 | B2 * | 2/2018 | Mitobe | B62D 1/06 |
| 10,167,017 | B2 * | 1/2019 | Haba | B62D 1/046 |
| 10,202,138 | B2 * | 2/2019 | Shimizu | B62D 1/08 |
| 2005/0121896 | A1 * | 6/2005 | Bonhard | B62D 1/06 280/779 |
| 2013/0032002 | A1 * | 2/2013 | Kuntzel | B62D 1/046 74/558 |
| 2015/0307022 | A1 * | 10/2015 | Nelson | B62D 1/046 701/36 |
| 2016/0114826 | A1 | 4/2016 | Moinard et al. | |
| 2017/0341683 | A1 | 11/2017 | Haba et al. | |

FOREIGN PATENT DOCUMENTS

| | | | |
|---|---|---|---|
| JP | 2016-521654 A | 7/2016 | |
| JP | 2017-214050 A | 12/2017 | |
| WO | WO-2008123804 A1 * | 10/2008 | ......... B60K 28/066 |
| WO | WO-2010007069 A1 * | 1/2010 | ............ B62D 1/046 |

* cited by examiner

*Primary Examiner* — Adam D Rogers
(74) *Attorney, Agent, or Firm* — Posz Law Group, PLC

(57) ABSTRACT

A steering wheel, in which a vibration device including a vibration motor is attached, the steering wheel includes: a ring portion including a core member and a thickness-reduced portion, reducing mass, provided with the core member. The vibration device is housed in the thickness-reduced portion and attached to the core member.

6 Claims, 7 Drawing Sheets

MODIFICATION

STEERING WHEEL

CROSS-REFERENCE TO RELATED APPLICATION(S)

This application is based upon and claims the benefit of priority from Japanese Patent Application No. 2018-062488, filed on Mar. 28, 2018, the entire contents of which are incorporated herein by reference.

BACKGROUND

1. Field of the Invention

The present invention relates to a steering wheel configured such that a vibration device that makes a driver gripping a ring portion during operation to feel vibration is attached to a core member of the ring portion.

2. Description of the Related Art

There has been known a steering wheel that operates a vibration device to generated vibration in a ring portion when a traveling vehicle deviates from a traveling lane, so as to inform the driver in steering gripping the ring portion of the danger (for example, see JP 2016-521654 A and JP 2017-214050 A). In such steering wheels, a recessed portion for housing is provided in the core member of the ring portion, and the vibration device is housed in the recessed portion for housing and attached to the core member of the ring portion.

However, in the related art steering wheels, the recessed portion for housing is provided in the core member of the ring portion in a shape that increases the sectional shape and recesses the recessed portion for housing without changing the volume of the core member itself. Therefore, when the vibration device is attached, the mass of the vibration device and the mass at the connection area of the vibration device are increased. Such a partial increase in mass of the ring portion is caused by the fact that the mass at the connection area of the vibration device partly increases greatly, and therefore, the connection area easily vibrates, the natural frequency of the steering wheel is lowered, a phenomenon that the ring portion easily vibrates during traveling of the vehicle is caused, and the tactile impression during steering of the steering wheel is deteriorated.

SUMMARY

The present invention has been made to solve the above problem and an object thereof is to provide a steering wheel that can suppress a partial increase in mass of a ring portion which causes a decrease in natural frequency even if a vibration device is attached to a core member of a ring portion.

According to an aspect of the present invention, there is provided a steering wheel, in which a vibration device including a vibration motor is attached, the steering wheel including: a ring portion including a core member; and a thickness-reduced portion, reducing mass, provided with the core member, wherein the vibration device is housed in the thickness-reduced portion and attached to the core member.

In the steering wheel according to the aspect of the present invention, even if the vibration device is attached to the core member of the ring portion, the vibration device is attached to the thickness-reduced portion that reduces the mass of the core member of the ring portion. Therefore, the increase in weight of the vibration device attached to the core member can be countered by the thickness-reduced portion provided on the core member of the ring portion, a substantial increase in the mass of the core member at the connection area of the vibration device can be suppressed, a decrease in the natural vibration portion of the steering wheel can be prevented, and unnecessary vibration of the steering wheel during travelling of the vehicle can be prevented from generating.

Therefore, in the steering wheel according to the aspect of the present invention, a partial increase in mass of the ring portion which causes a decrease in natural frequency can be suppressed even if the vibration device is attached to the core member of the ring portion.

In the steering wheel according to the aspect of the present invention, the vibration device may include an attaching bracket that holds the vibration motor and is attached to the core member, in which the attaching bracket is disposed such that: attachment portions attached to the core member are disposed at both ends along a circumferential direction of the ring portion, and the attachment portions on both ends are attached to portions of a thickness-unreduced portion of the core member in both end sides of the thickness-reduced portion so as to cross through the thickness-reduced portion for reinforcement of the core member.

In such a configuration, the thickness-reduced portion is provided on the ring core member, and even if the strength of the ring core member decreases, the strength reduction can be suppressed by the attaching bracket. Further, by adjusting the weight of the attaching bracket itself, it is also possible to adjust the mass of the thickness-reduced portion provided with the vibration device in the core member, so that the natural frequency of the steering wheel can be more reliably prevented from lowering.

In the steering wheel according to the aspect of the present invention, the a reinforcement member that reinforces the core member may be disposed to be adjacent to the vibration device, and connected to portions of the thickness-unreduced portion of the core member in both end sides of the thickness-reduced portion so as to cross through the thickness-reduced portion.

In such a configuration, both the reinforcement member and the vibration device can deal with the decrease in the strength and mass change of the core member due to the thickness-reduced portion, so that it is possible to widen the range of adjustment for the strength decrease and mass change of the core member due to the thickness-reduced portion. Of course, it is also possible to deal with the strength decrease and mass change of the core member by the thickness-reduced portion only by the reinforcement member separately attached to the core member, so that there is no restriction on the strength, size or shape of the attaching member for the core member of the vibration device, and the degree of freedom of the specification of the vibration device can also be increased.

Further, in the steering wheel according to the aspect of the present invention, in the core member, a connecting portion for reinforcement that connects the thickness-unreduced portion of the core member at both end sides of the thickness-reduced portion may be disposed integrally with the core member by extending a forming material of the core member in a connection area of the thickness-reduced portion.

In such a configuration, the strength decrease of the portion of the core member provided in the thickness-reduced portion is supplemented by the core member itself, and therefore, it is not necessary to attach a reinforcement member separately.

Further, in the steering wheel according to the aspect of the present invention, the thickness-reduced portion may be provided with a spatial portion that is recessed from an inner circumference side to an outer circumference side of the core member and penetrates vertically from a plan view of the ring portion.

In such a configuration, the core member of the ring portion has the spatial portion without the core member disposed on the inner circumference side of an area of the thickness-reduced portion in the inner circumference side, so that circuit board with the connector for coupling the lead wire for driving the vibration motor of the vibration device can be disposed on the side of the spatial portion, and the circuit board provided to protrude from the vibration device can be smoothly disposed on the ring portion.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
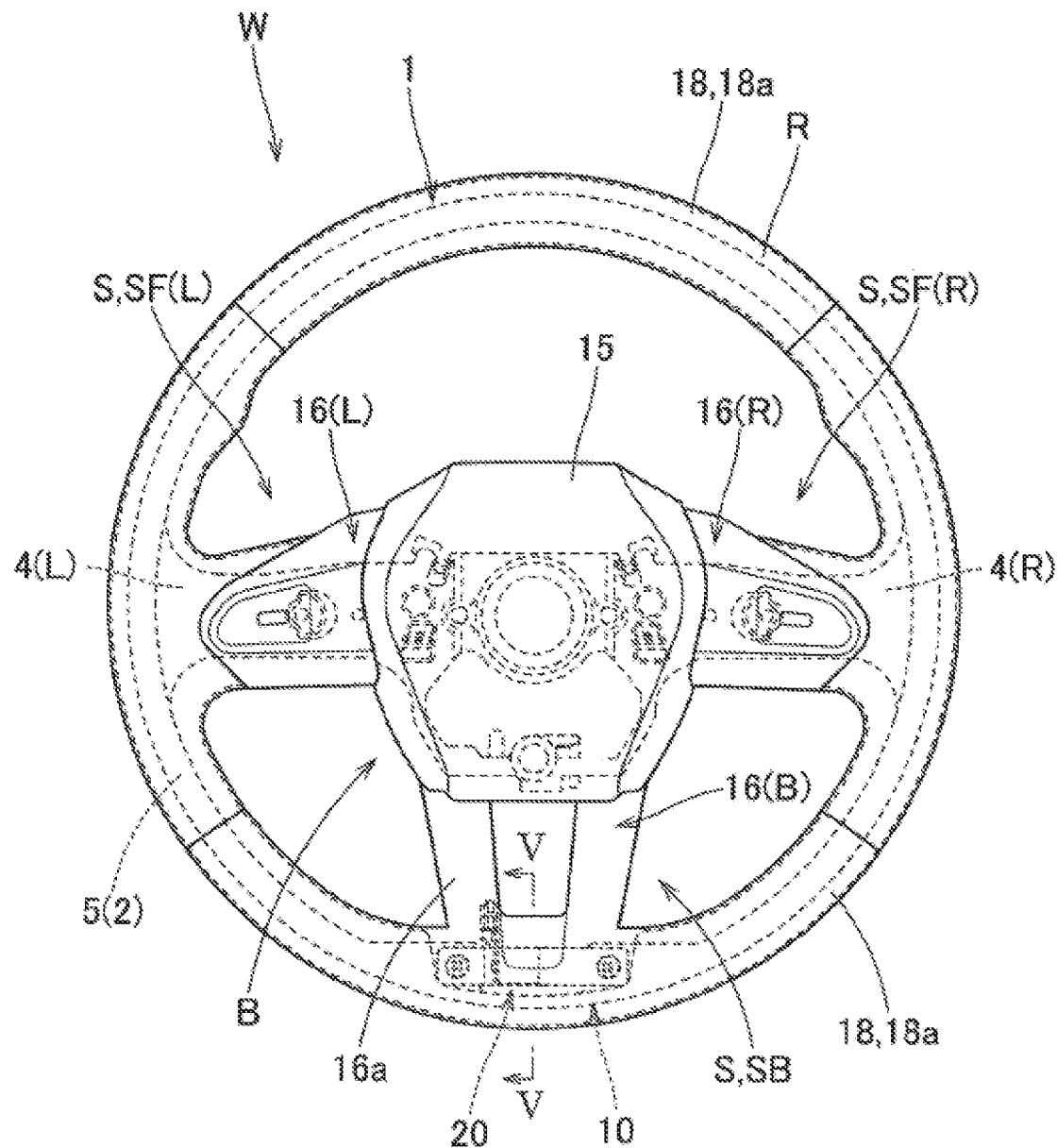
FIG. 1 is a schematic plan view of a steering wheel according to one embodiment of the present invention.
Figure 2:
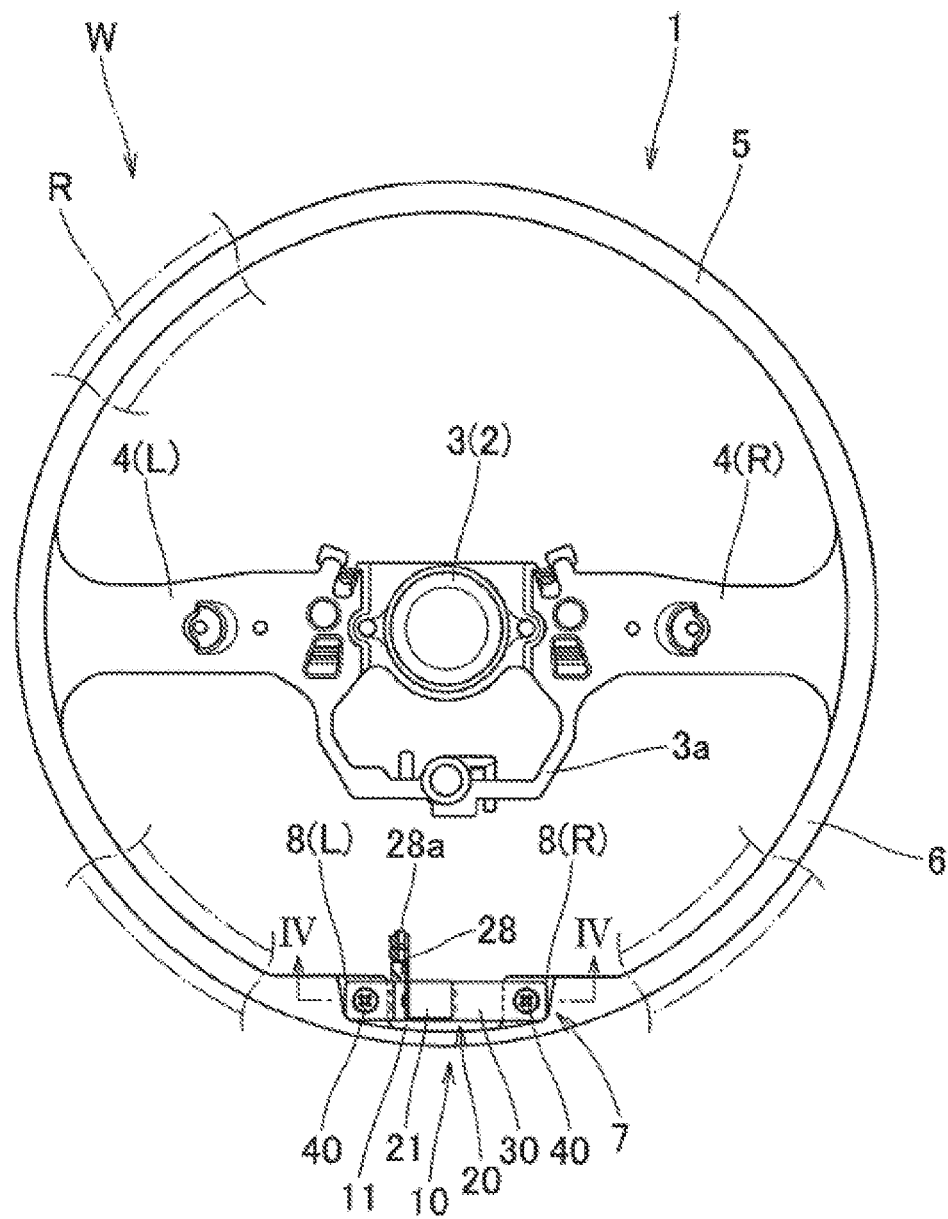
FIG. 2 is a schematic plan view showing a core member to which a vibration device is attached in the steering wheel according to the embodiment.

Hereinafter, an embodiment of the present invention will be described with reference to the drawings. As shown in FIGS. 1 and 2, a steering wheel W of the embodiment includes a vibration device 20 and a steering wheel main body 1. The steering wheel main body 1 includes a substantially annular ring portion R gripped by a driver at the time of steering, a boss portion B disposed at the center of the ring portion R and fastened to a steering shaft (not shown), and a plurality of (three in the present embodiment) spoke portions S connecting the ring portion R and the boss portion B. Further, the steering wheel main body 1 includes a core member 2 disposed so as to connect the ring portion R, the boss portion B, and the spoke portions S. The core member 2 includes a boss core member 3 disposed in the boss portion B, a spoke core member 4 disposed in the spoke portions 5, and a ring core member 5 disposed in the ring portion R. Further, in the core member 2, a portion to be connected to the steering shaft (not shown) of the boss core member 3 is made of steel, and other portions are formed by die cast casting from a light alloy material such as an aluminum alloy or the like.

Figure 5:
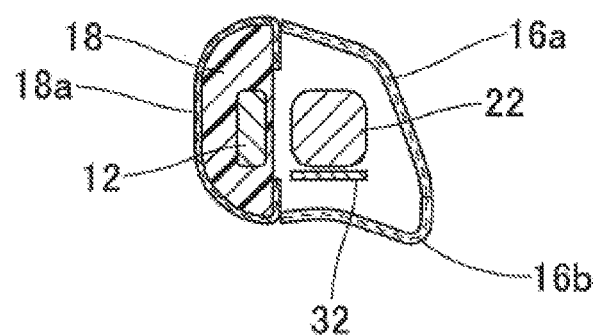
FIG. 5 is a schematic enlarged sectional view of the connection area of the vibration device according to the embodiment, corresponding to the V-V part of FIG. 1.
Figure 6:
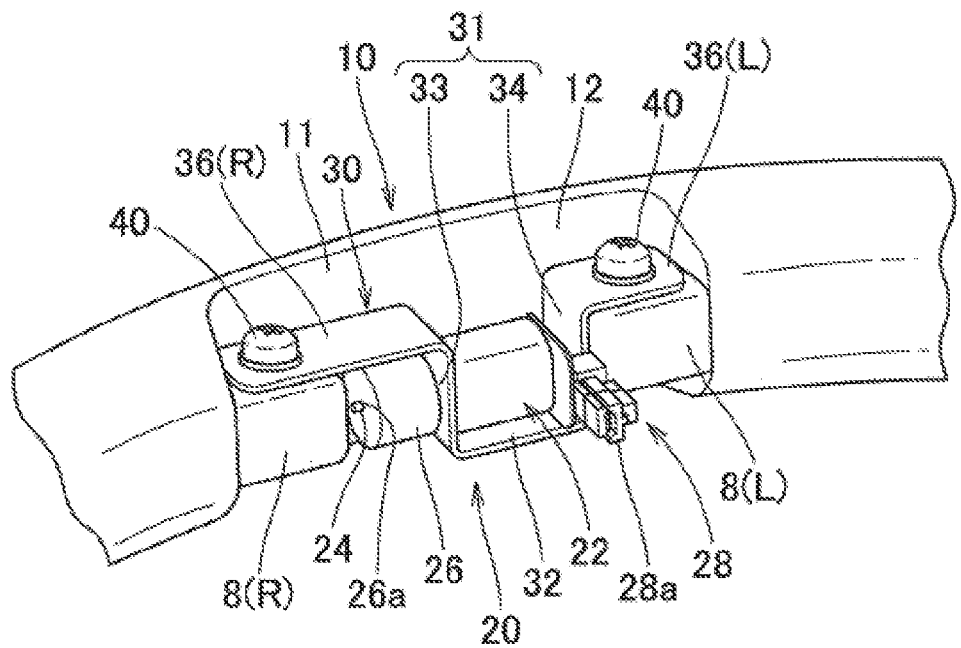
FIG. 6 is a schematic partial perspective view of the vicinity of the connection area of the vibration device according to the embodiment.

Further, the spoke core member 4 is disposed only at the positions of two left and right spoke portions SF(L, R) on the front side. In a rear-side spoke portion SB, only a rear extension portion 3a is disposed to extend rearward from the boss core 3, and the spoke core member 4 is not provided with a portion to connect with the ring core member 5. That is, the rear-side spoke portion SB covers the space between the rear extension portion 3a and the ring core member 5 by a cover 16B (including an upper portion 16a and a lower portion 16b) made by synthetic resin (see FIGS. 1 and 5).

The spoke core member 4 of the left and right spoke portions SFL, SFR is also covered with covers 16L, 16R made of synthetic resin. The covers 16L, 16R also include an upper portion and a lower portion which are divided into upper and lower halves to cover the spoke core member 4 in the left and right spoke portions SFL, SFR.

In the steering wheel main body 1, the covering portion 18 is disposed around the ring core member 5 and the spoke core member 4 in the vicinity of the ring core member 5. The covering portion 18 is formed by a leather 18a on an outer circumferential surface side of a resin portion such as urethane covering the core members 4, 5.

A lower cover (not shown) made of synthetic resin is disposed on a lower side of the boss portion B, and a pad 15 provided with an air bag device (not shown) is disposed on an upper side of the boss portion B.

As shown in FIGS. 1-6, the vibration device 20 is disposed on the ring core member 5 at a crossing position of the rear-side spoke portion SB and the intersect R. From a plan view of the ring portion R, at the connection area 10 of the vibration device 20 in the ring core member 5, a spatial portion 11a which is recessed from an inner circumference side to an outer circumference side of the ring core member 5 and penetrates vertically is provided to form a thickness-reduced portion 11.

The connection area 10 of the vibration device 20 includes a thickness-reduced portion 11 formed by the spatial portion 11a and a connecting portion 12 on the outer circumference side of the ring core member 5. The ring core member 5 includes a connection area 10 provided with the thickness-reduced portion 11 and a thickness-unreduced portion 6 as a general portion. The thickness-unreduced portion 6 as the general portion is formed in an inverted U-shaped cross section having a recessed groove on a back surface side except in the vicinity of the crossing portion with the spoke core member 4. Attaching seats 8(L, R) of an attaching bracket 30 to be described later of the vibration device 20 are formed in a vicinity portion 7 of the thickness-reduced portion 11 (connection area 10) in the thickness-unreduced portion 6.

The volume of the spatial portion 11a of the thickness-reduced portion 11 can secure a volume capable of housing the vibration device 20, and is set to be substantially equal to a volume of the forming material of the core member 5 substantially corresponding to the weight of the vibration device 20.

The vibration device 20 includes a vibration motor 21 attached with a weight 26, the attaching bracket 30, and a circuit board 28 provided with a connector 28*a* for connecting a lead wire (not shown) for supplying driving power (DC 12V) to the vibration motor 21. The circuit board 28 includes an electronic circuit provided with an IC chip for removing electric noises. Further, when a traveling vehicle deviates from a traveling lane, the driving power supplied from a predetermined control device flows to the lead wire (not shown) connected to the connector 28*a* so as to operate the vibration motor 21 of the vibration device 20, thereby operating the vibration device 20.

The vibration motor 21 includes a substantially cylindrical motor main body 22, a rotary driving shaft 24 protruding from one end surface 22*a* of the motor main body 22, and the weight 26 fixed to the rotary driving shaft 24. The one end surface 22*a* is in contact with a longitudinal plate portion 33 to be described later of the attaching bracket 30, and the motor main body 22 is fixed to the longitudinal plate portion 33 by a screw 38 penetrating the longitudinal plate portion 33 and fastened to the end surface 22*a* side. In addition, in the motor main body 22, the circuit board 28 is screwed by a screw 39 on an end surface 22*b* side opposite to the end surface 22*a* where the rotary driving shaft 24 protrudes.

When attaching the vibration device 20 to the connection area 10, the circuit board 28 protrudes from the thickness-reduced portion 11 toward the boss portion B side which is the inner circumference side of the ring core member 5, and is disposed such that a corresponding lead wire can be fastened to the connector 28*a* from the boss portion B side.

The weight 26 attached to the rotary driving shaft 24 has a plate shape having a thickness of approximately ⅓ circle, and is provided with a fitting hole 26*a* fitted to the rotary driving shaft 24 at an eccentric position.

As shown in FIGS. 2 to 5, the attaching bracket 30 is made of sheet metal, includes attachment portions 36(L, R) at both ends and a holding plate portion 31 for holding the motor main body 22, and is formed by bending a metal plate such as a steel plate. The holding plate portion 31 has a U-shaped cross section and includes a rectangular plate-shape lateral plate portion 32 extending along the circumferential direction of the ring portion R, and longitudinal plate portions 33, 34 extending upward from both ends of the lateral plate portion 32. The longitudinal plate portion 33 is a portion to which the motor main body 22 is attached, and includes a penetration hole 33*a* through which the rotary driving shaft 24 protrudes. Attachment holes (not shown) for screwing the motor main body 22 with the screw 38 are provided at two positions around the penetration hole 33*a*.

The attachment portions 36(L, R) are in the shape of a rectangular plate extending along the circumferential direction of the ring portion R from the end portions of the longitudinal plate portions 33, 34 remote from the lateral plate portion 32, and penetrate attachment holes 36*a* corresponding to the attachment holes 8*a* of the attaching seats 8(L, R) of the ring core member 5, respectively, along the vertical direction.

Further, the attachment portions 36(L, R) at both ends are attached to the attaching seats 8(L, R), and the attaching bracket 30 is set with a plate thickness, a width dimension, or a material such that, when being fixed to the ring core member 5, strength such as bending deformation over the entire circumference of the ring core member 5 can be complemented with respect to the connecting portion 12 which connects the attaching seats 8L, 8R covering the outer circumference side of the thickness-reduced portion 11.

For the description of assembling operation of the vibration device 20, the circuit board 28 is screwed to the end surface 22*b* of the motor main body 22 with the screw 39, and the circuit board 28 is attached to the motor main body 22. Then, the rotary driving shaft 24 of the motor main body 22 is protruded from the penetration hole 33*a* of the longitudinal plate portion 33 of the attaching bracket 30, the surface of the longitudinal plate portion 33 on the lateral plate portion 32 side comes into contact with the end surface 22*a* of the motor main body 22, and the screw 38 is fastened to the motor main body 22 via an attachment hole (not shown) of the longitudinal plate portion 33 so as to attach the motor main body 22 to the longitudinal plate portion 33. During the attachment, the connector 28*a* of the circuit board 28 protrudes from the lateral plate portion 32 along the width direction thereof which is a direction orthogonal to a facing direction of the attachment portions 36L, 36R along the longitudinal plate portion 34. Then, after the motor main body 22 is attached to the longitudinal plate portion 33, the rotary driving shaft 24 is fitted in the fitting hole 26*a*, the outer circumference side of the fitting hole 26*a* is crimped so as to press toward the rotary driving shaft 24 side, and once the weight 26 is attached to the rotary driving shaft 24, the work of attaching the motor main body 21 to the attaching bracket 30 is completed, and the assembly of the motor main body 20 is completed.

The attachment portions 36L, 36R of the attaching bracket 30 come into contact with the attaching seats 8L, 8R of the ring core member 5 in the steering wheel main body 1 with the connector 28*a* facing the boss portion B side, and the assembled vibration device 20 is attached to the connection area 10 of the ring core member 5 once the screw 40 is fastened to the attachment holes 8*a* through the attachment holes 36*a*, 36*a*. In the ring core member 5, a covering portion 18 is previously disposed.

Then, except for the pad 15, the cover 16(L, B, R) and the lower cover (not shown) are attached to the steering wheel main body 1, and the steering wheel main body 1 is attached to the steering shaft of the vehicle. Next, a lead wire for inputting an operation signal to an air bag device (not shown) and a predetermined lead wire for operating the vibration device 20 are connected to the connector 28*a*, and once the pad 15 with the air bag device is assembled to the boss portion B, the steering wheel W provided with the vibration device 20 can be mounted on the vehicle.

After the steering wheel W is mounted on the vehicle, when a traveling vehicle deviates from a traveling lane, driving power is supplied to the vibration motor 21 of the vibration device 20 by a predetermined control device, the rotary driving shaft 24 on which the motor main body 22 has the eccentric weight 26 is rotated to vibrate the ring core member 5, so that the driver who is steering while gripping the vibrating ring portion R is notified that the traveling vehicle deviates from a traveling lane.

In the steering wheel W according to the present embodiment, even if the vibration device 20 is attached to the ring core member 5 of the ring portion R, the vibration device 20 is attached to the thickness-reduced portion 11 that reduces the mass of the ring core member 5. Therefore, the increase in weight of the vibration device 20 attached to the ring core member 5 can be countered by the thickness-reduced portion 11 provided on the ring core member 5, a substantial increase in the mass of the ring core member 5 at the connection area 10 of the vibration device 20 can be suppressed, a decrease in the natural vibration portion of the steering wheel W can be prevented, and unnecessary vibration of the steering wheel W during travelling of the vehicle can be prevented from generating.

Therefore, in the steering wheel of the present embodiment, even if the vibration device 20 is attached to the ring core member 5 of the ring portion R, a partial increase in mass of the ring portion R which causes a decrease in natural frequency can be suppressed. As a result, a reduction in natural frequency of the steering Wheel W can be prevented, and unnecessary vibration of the steering wheel W during travelling of the vehicle can be prevented from generating.

In the steering wheel W of the present embodiment, the vibration device 20 includes the attaching bracket 30 that holds the vibration motor 21 and is attached to the ring core member 5. The attaching bracket 30 is disposed such that the attachment portions 36(L, R) attached to the ring core member 5 are disposed at both ends along the circumferential direction of the ring portion R, and the attachment portions 36(L, R) on both ends are attached to the portions (attaching seats) 8(L, R) of the thickness-unreduced portion 6 of the ring core member 5 in both end sides of the thickness-reduced portion 11 so as to cross through the thickness-reduced portion 11 for reinforcement of the ring core member 5.

Therefore, in the present embodiment, the thickness-reduced portion 11 is provided on the ring core member 5, and even if the strength of the ring core member 5 decreases, the strength reduction can be suppressed by the attaching bracket 30. Further, by adjusting the weight of the attaching bracket 30 itself, it is also possible to adjust the mass of the thickness-reduced portion 11 provided with the vibration device 20 in the ring core member 5, so that the natural frequency of the steering wheel W can be more reliably prevented from lowering.

Figure 7:
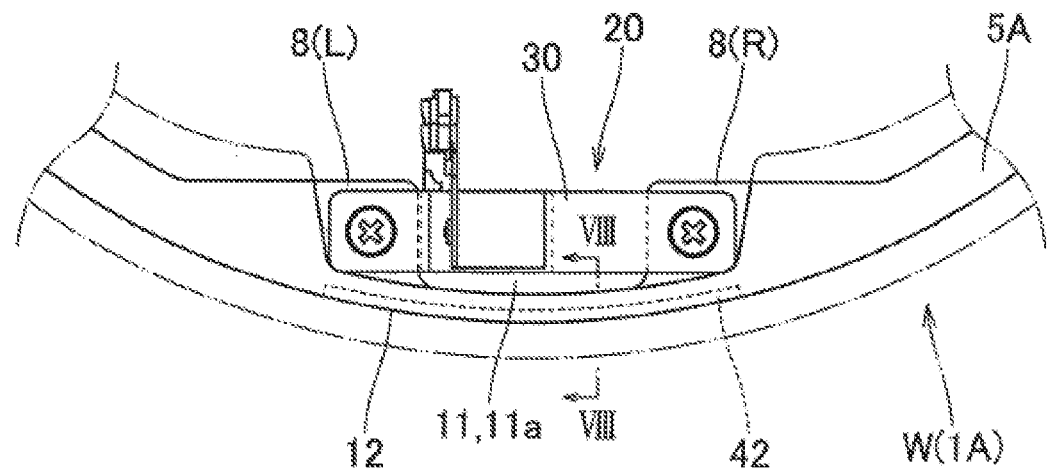
FIG. 7 is a schematic partial plan view showing a modification of the core member of the embodiment.
Figure 8:
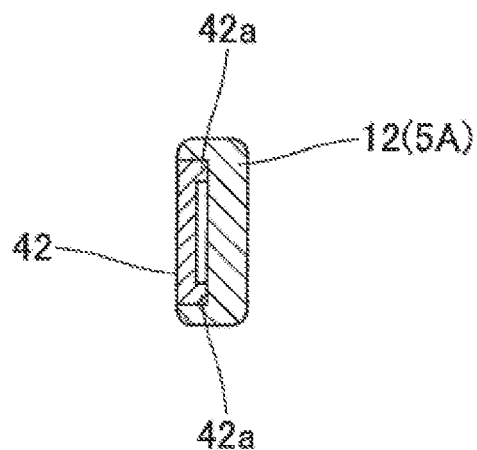
FIG. 8 is a schematic sectional view of the VIII-VIII part shown in FIG. 7.

Regarding the reduction in the strength of the ring core member 5 by providing the thickness-reduced portion 11, a ring core member 5A of a steering wheel main body 1A may be configured as in the steering wheel W shown in FIGS. 7 and 8. In the ring core member 5A, a reinforcement member 42 for reinforcing the ring core member 5A is used. The reinforcement member 42 is formed of a metal plate such as a steel plate and includes ribs 42a for reinforcement. The reinforcement member 42 is disposed to be adjacent to the vibration device 20, and connected to the portions (attaching seats) 8(L, R) of the thickness-unreduced portion 6 of the ring core member 5A in both end sides of the thickness-reduced portion 11 so as to cross through the thickness-reduced portion 11. The reinforcement member 42 can be attached to the ring core member 5A by welding and attaching to the attaching seat 8, screwing, forcibly fitting or the like.

In the ring core member 5A having such a configuration, both the reinforcement member 42 and the vibration device 20 (attaching bracket 30) can deal with the decrease in the strength and mass change of the ring core member 5A due to the thickness-reduced portion 11, so that it is possible to widen the range of adjustment for the strength decrease and mass change of the ring core member 5A due to the thickness-reduced portion 11. Of course, it is also possible to deal with the strength decrease and mass change of the ring core member 5A by the thickness-reduced portion 11 only by the reinforcement member 42 separately attached to the ring core member 5A, so that there is no restriction on the strength, size or shape of the attaching bracket 30 as the attaching member for the ring core member 5A of the vibration device 20, and the degree of freedom of the specification of the vibration device 20 can also be increased.

Figure 9:
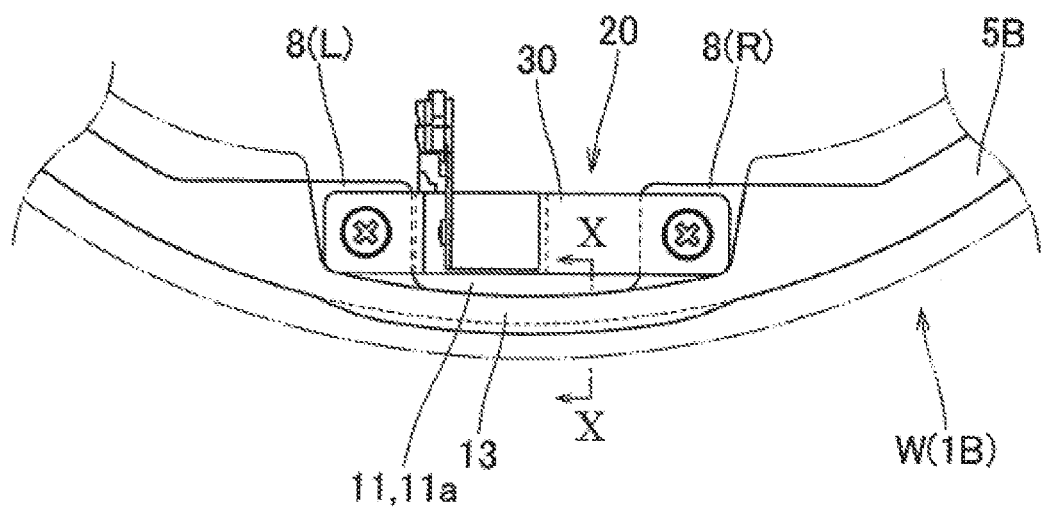
FIG. 9 is a schematic partial plan view showing another modification of the core member of the embodiment.
Figure 10:
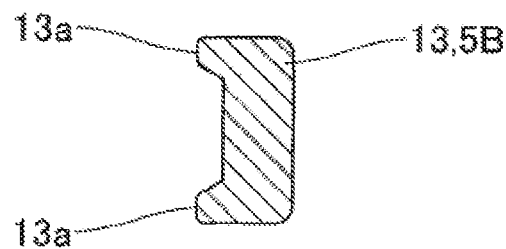
FIG. 10 is a schematic sectional view of the X-X part shown in FIG. 9.

Of course, instead of using the reinforcement member 42 separate from the ring core member 5A, a ring core member 5B of a steering wheel main body 1B may also be configured as in the steering wheel W shown in FIGS. 9 and 10. In the ring core member 5B, a connecting portion for reinforcement 13 for connecting the portions (attaching seats) 8L, 8R of the thickness-unreduced portion 6 of the ring core member 5B at both end sides of the thickness-reduced portion 11 to each other is disposed integrally with the ring core member 5B by extending the forming material of the ring core member 5B in a connection area of the vibration device (housing portion of the vibration device 20) 10, which is formed in the thickness-reduced portion 11.

In the ring core member 5B having such a configuration, the strength decrease of the connection area (housing portion) 10 of the ring core member 5B provided in the thickness-reduced portion 11 is supplemented by the ring core member 5B itself, and therefore, it is not necessary to attach a reinforcement member separately.

Figure 3:
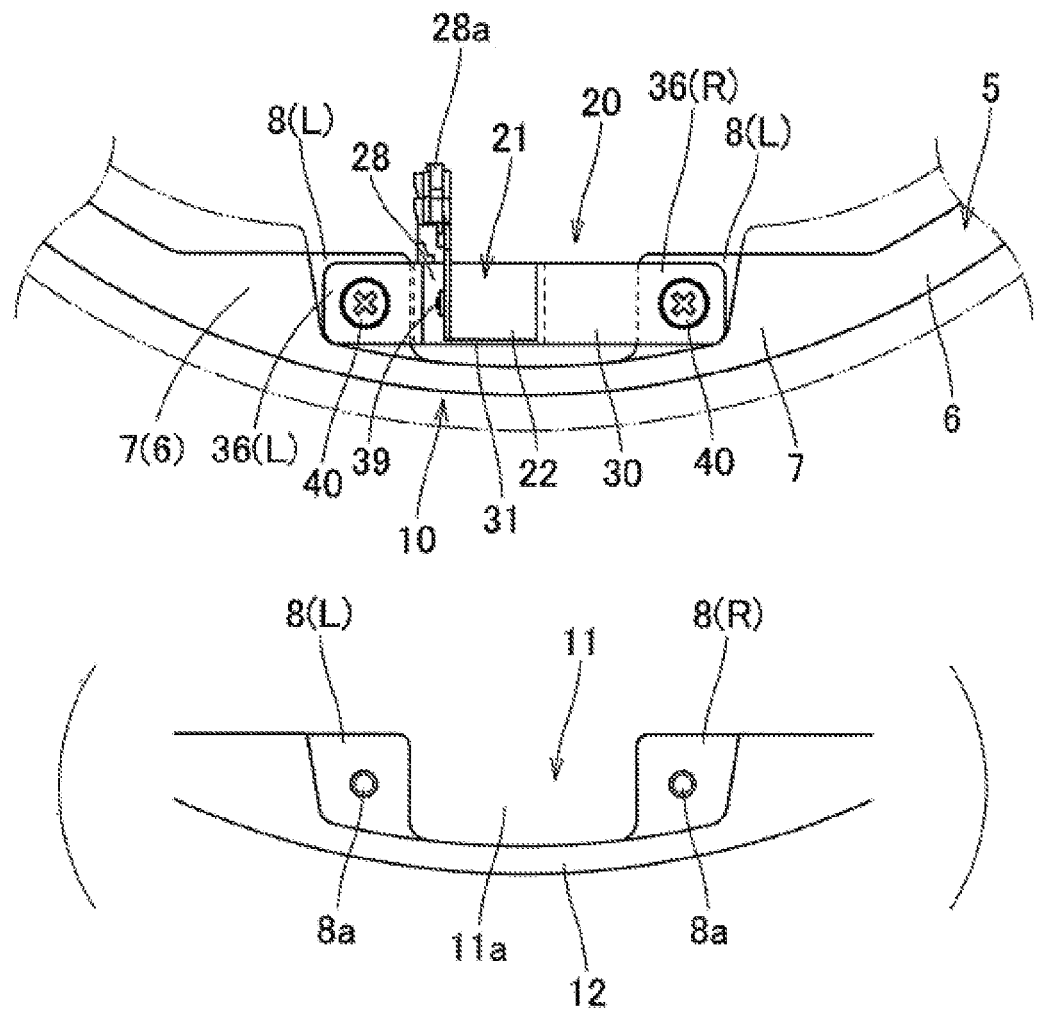
FIG. 3 is a schematic enlarged plan view of a vicinity of a connection area where the vibration device according to the embodiment is attached.
Figure 3:
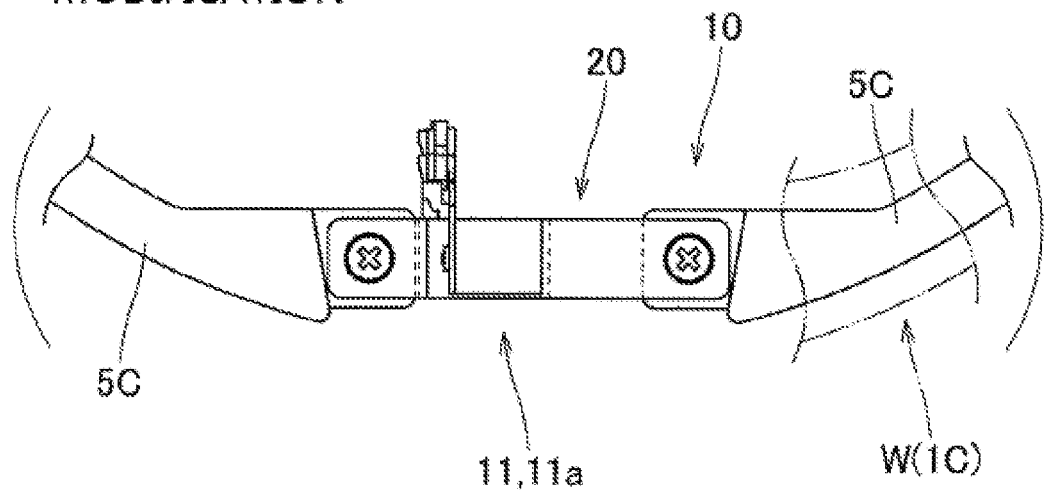
Figure 4:
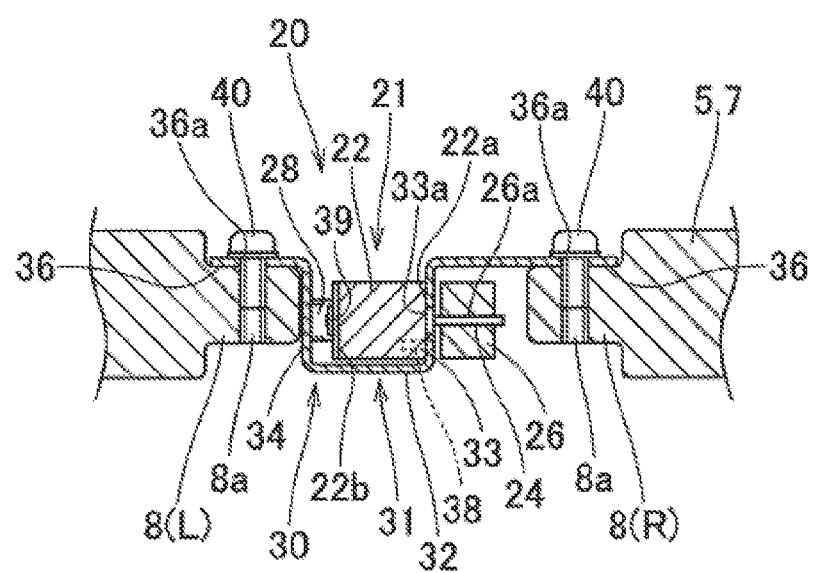
FIG. 4 is a schematic enlarged sectional view of the connection area of the vibration device according to the embodiment, corresponding to the IV-IV part of FIG. 2.

Further, in the steering wheel W of the present embodiment, the thickness-reduced portion 11 is provided with the spatial portion 11a which is recessed from the inner circumference side to the outer circumference side of the ring core member 5 and penetrates vertically from a plan view of the ring portion R (see parentheses in the upper part of FIG. 3).

Therefore, in the present embodiment, the ring core member 5 of the ring portion R has the spatial portion 11a without the ring core member 5 disposed on the inner circumference side of an area of the thickness-reduced portion 11 in the inner circumference side, so that circuit board 28 with the connector 28a for coupling the lead wire for driving the vibration motor 21 of the vibration device 20 can be disposed on the side of the spatial portion 11a (see FIG. 3), the connector 28a of the circuit board 28 provided to protrude from the vibration device 20 can be smoothly disposed on the ring portion R, and the lead wire extending from the boss portion B side for driving the vibration device 20 can be smoothly arranged a space-saving manner.

In the present embodiment, the connecting portion 12 extending from the ring core member 5 is disposed so as to connect the attaching seats 8(L, R) when providing the thickness-reduced portion 11. However, the portion of the connecting portion 12 may also be configured as the spatial portion 11a without providing a portion of the ring core member 5C in the connection area (housing portion of the vibration device 20) 10 of the thickness-reduced portion 11 as the ring core member 5C of the steering wheel main body 1C in the steering wheel W (see parentheses in the lower part of FIG. 3) as long as the attaching bracket 30 of the vibration device 20 that connects the attaching seats 8(L, R) can prevent the strength decrease of the ring core member 5.

Figure 11:
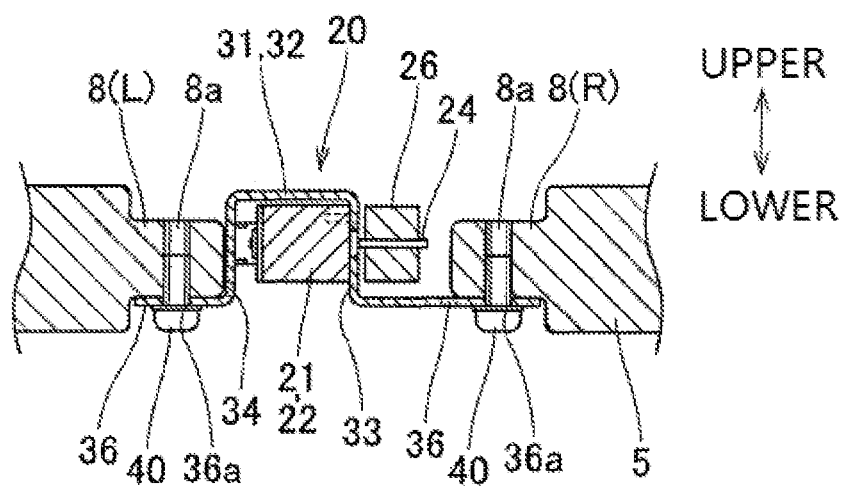
FIG. 11 is a schematic enlarged sectional view of a state in which the vibration device is attached in a reverse manner of the embodiment with upside down.
Figure 12:
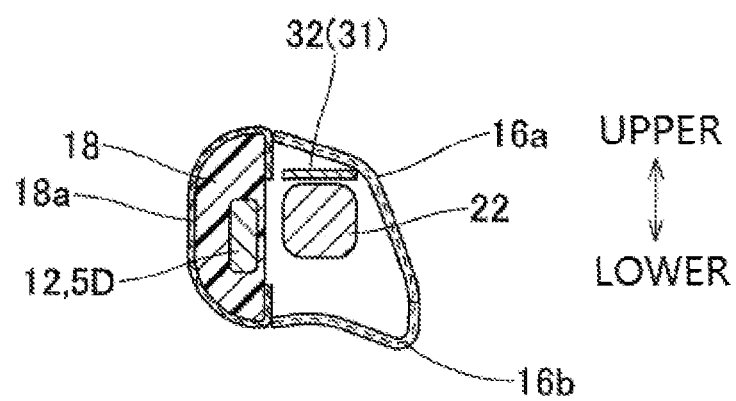
FIG. 12 is a schematic sectional view showing a ring portion of the steering wheel in the state shown in FIG. 11.

In the present embodiment, the attachment portion 36 of the attaching bracket 30 of the vibration device 20 is attached and screwed by the screw 40 to the attaching seats 8(L, R) from an upper side of the ring core member 5, and with upside down, the attachment portion 36 of the attaching bracket 30 of the vibration device 20 may also be attached and screwed by the screw 40 to the attaching seats 8(L, R) from a lower side of the ring core member 5 (see FIGS. 11 and 12). In this attachment state, the motor main body 22 of the vibration motor 21 may be disposed at a lower side of the lateral plate portion 32 of the holding plate portion 31 of the attaching bracket 30, so as to attach the vibration device 20.

What is claimed is:

1. A steering wheel, in which a vibration device including a vibration motor is attached, the steering wheel comprising:
a ring portion including a core member;
a thickness-reduced portion, reducing mass, provided with the core member; and
a reinforcement member that reinforces the core member, wherein
the vibration device is housed in the thickness-reduced portion and attached to the core member, and
the reinforcement member is disposed to be adjacent to the vibration device, and connected to portions, other than the thickness-reduced portion, of the core member in both end sides of the thickness-reduced portion so as to cross through the thickness-reduced portion.

2. The steering wheel according to claim 1, wherein
the thickness-reduced portion is provided with a spatial portion that is recessed from an inner circumference side to an outer circumference side of the core member and penetrates vertically from a plan view of the ring portion.

3. A steering wheel, in which a vibration device including a vibration motor is attached, the steering wheel comprising:
a ring portion including a core member;
a thickness-reduced portion, reducing mass, provided with the core member; and
a connecting portion that connects portions of the core member at both end sides of the thickness-reduced portion, the portions being portions of the core member other than the thickness-reduced portion, wherein
the vibration device is housed in the thickness-reduced portion and attached to the core member, and
the connecting portion is disposed integrally with the core member by extending the core member in a connection area of the vibration device, which is formed in the thickness-reduced portion.

4. The steering wheel according to claim 3, wherein
the thickness-reduced portion is provided with a spatial portion that is recessed from an inner circumference side to an outer circumference side of the core member and penetrates vertically from a plan view of the ring portion.

5. A steering wheel, in which a vibration device including a vibration motor is attached, the steering wheel comprising:
a ring portion including a core member; and
a thickness-reduced portion, reducing mass, provided with the core member, wherein
the vibration device is housed in the thickness-reduced portion and attached to the core member,
the vibration device includes an attaching bracket that holds the vibration motor and is attached to the core member,
the attaching bracket includes attachment portions that are attached to the core member and are disposed at both ends of the attaching bracket along a circumferential direction of the ring portion, and
both ends of the attachment portions are attached to portions, other than the thickness-reduced portion, of the core member in both end sides of the thickness-reduced portion so as to cross through the thickness-reduced portion for reinforcement of the core member.

6. The steering wheel according to claim 5, wherein
the thickness-reduced portion is provided with a spatial portion that is recessed from an inner circumference side to an outer circumference side of the core member and penetrates vertically from a plan view of the ring portion.

* * * * *